(12) United States Patent
Glen et al.

(10) Patent No.: US 6,518,970 B1
(45) Date of Patent: Feb. 11, 2003

(54) GRAPHICS PROCESSING DEVICE WITH INTEGRATED PROGRAMMABLE SYNCHRONIZATION SIGNAL GENERATION

(75) Inventors: David Glen, Toronto (CA); David Yeh, Thornhill (CA)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/553,144

(22) Filed: Apr. 20, 2000

(51) Int. Cl.$^7$ ............................................... G06T 15/60
(52) U.S. Cl. ...................................................... 345/501
(58) Field of Search ................................ 345/501, 518, 345/519, 520, 522, 502

(56) References Cited

U.S. PATENT DOCUMENTS

| | | | | |
|---|---|---|---|---|
| 6,317,525 B1 | * | 11/2001 | Aleksic et al. ............... | 382/299 |
| 6,331,852 B1 | * | 12/2001 | Gould et al. ................. | 345/419 |
| 6,335,761 B1 | * | 1/2002 | Glen et al. ................... | 348/557 |
| 6,380,945 B1 | * | 4/2002 | MacInnis et al. ........... | 345/602 |

OTHER PUBLICATIONS

Promotional material, "Industry's first HDTV–compliant triple DACs", Texas Instruments, Jun. 1999.

* cited by examiner

*Primary Examiner*—Cliff N. Vo
(74) *Attorney, Agent, or Firm*—Vedder, Price, Kaufman & Kammholz

(57) ABSTRACT

An integrated graphics processor provides a type of universal programmable synchronization signal generation that provides a plurality of different formats of display synchronization signals. In one embodiment, the integrated graphics processor includes a graphic and video blender that mixes image layers together prior to output for display. The graphics and video blender receives graphics and video data obtained from a frame buffer that may contain multiple formats of data, such as data in different color spaces, such as in a YUV color space (i.e., as per ITU-R BT709 or ITU-R BT 601), and in RGB color space. The integrated graphics processor also includes an integrated (internal or on-chip) programmable embedded synchronization signal generator operatively coupled to the graphic and video blender, to provide a plurality of different formats of display synchronization signals for blended information based on a type of display device. Accordingly, the integrated graphics processor can be programmed to provide suitable luma and chroma display information for different types of display devices, such as standard television displays, HDTV displays, and other displays that may require, for example, embedded synchronization signals, an embedded multilevel synchronization signal, or a separate synchronization signal.

31 Claims, 4 Drawing Sheets

FIG. 2

GRAPHICS PROCESSING DEVICE WITH INTEGRATED PROGRAMMABLE SYNCHRONIZATION SIGNAL GENERATION

FIELD OF THE INVENTION

The invention relates generally to video graphics processing and more particularly to integrated graphics processors that provide analog output in different color space formats and that provide embedded synchronization signals for display devices.

BACKGROUND OF THE INVENTION

Computers or other display generating devices are known to include a central processing unit, system memory, peripheral ports, audio processing circuitry, and video processing circuitry. Typically, the video processing circuitry receives graphics data from the central processing unit and prepares it for display on a computer monitor, television, and/or LCD panel. The computer generates the graphics data by performing one or more applications such as word processing applications, drawing applications, presentation applications, spread sheets, operating system functionality, etc. The video graphics processing circuit processes the graphics data to produce RGB (red, green, blue) digital data, which may be converted to analog data that is provided to the monitor.

The video graphics circuitry may also include a video decoder and video capture module for processing YUV data. The video decoder is operably coupled to receive video signals from a video source such as a cable box, satellite receiver, antenna, VCR, DVD player, etc. Upon receiving the video signal, which is formatted for a television or other video display device, the video decoder produces digital representations thereof The digital representations are stored as YUV data (as used herein, YUV includes YCbCr and YPbPr) in the video capture module. For the video graphics processor to process the YUV data, it first converts the YUV data into an RGB color base. Once in the RGB color base, the video graphics processor can blend the video data and graphics data to produce an output image. Also YUV source data is not required since graphics processors can generate YPbPr from an image with just graphics and no video.

The output image is in a digital RGB color base format and can be provided directly to an LCD panel or converted to an analog RGB signal via a digital-to-analog converter (DAC). If the computer is also providing the output image to a television monitor, the digital RGB color base data is converted to YUV color base data. As such, the video graphics processing circuitry would further include an RGB-to-YUV converter.

As known in the art, high definition television standards define a trilevel embedded synchronization signal to provide horizontal, vertical and blanking synchronization for three wire component video analog YPbPr or RGB based display devices. Other devices may require analog RGB data and separate synchronization signals or separate wires resulting in a four or five wire system.

High definition television devices and high quality standard definition television, typically use an analog YPbPr (or RGB) three wire component video input wherein the synchronization signals are embedded with the luma and chroma information, as known in the art. These are known as component input televisions. A problem arises when a single integrated graphics processor chip needs to send display information in multiple formats for different types of display devices, such as a component input television, versus a computer monitor, since conventional integrated graphics processors do not provide programmable embedded synchronization signal generation for output to different types of display devices, or the logic to convert from RGB to the component video YPbPr color space.

One type of digital to analog converter (DAC) chip includes HDTV compliant triple digital to analog converters which receive digital information from a source and can output a trilevel synchronization pulse along with the YPbPr information while also being programmable to output conventional analog RGB information. However, such integrated circuits typically require additional external analog to digital conversion circuitry and other circuitry to provide suitable input to the digital to analog converter (DAC). Also, such digital to analog converters cannot provide graphic and video blending or color space conversion (e.g., between RGB and YUV color space).

Accordingly, there exists a need for an improved integrated graphics processor that provides integrated programmable synchronization pulse generation to provide different formats of display synchronization signals for blended information based on requirements of different display device types. It would be desirable if such a processor reduced output pin requirements compared to using external YPbPr encoders.

BRIEF DESCRIPTION OF THE DRAWINGS

The invention will be more readily understood with reference to the following drawings wherein:

FIG. 2 illustrates an integrated graphics processor in accordance with another embodiment of the invention.

DETAILED DESCRIPTION OF A PREFERRED EMBODIMENT OF THE INVENTION

Generally, an integrated graphics processor provides a type of universal programmable synchronization signal generation that provides a plurality of different formats of display synchronization signals. In one embodiment, the integrated graphics processor includes a graphic and video blender that mixes image layers together prior to output for display. The graphics and video blender receives graphics and video data obtained from a frame buffer that may contain multiple formats of data, such as data in different color spaces, such as in a YUV color space (i.e., as per ITU-R BT709 or ITU-R BT 601), and in RGB color space. The integrated graphics processor also includes an integrated (internal or on-chip) programmable embedded synchronization signal generator operatively coupled to the graphic and video blender, to provide a plurality of different formats of display synchronization signals for blended information based on a type of display device. Accordingly, the integrated graphics processor can be programmed to provide suitable luma and chroma display information for different types of display devices, such as standard television displays, HDTV displays, and other displays that may require, for example, embedded synchronization signals, an embedded multilevel synchronization signal, or a separate synchronization signal.

In one embodiment, a separate programmable color conversion scaling pipeline is provided for graphics RGB information, and a separate programmable color conversion and scaling circuit is provided in another pipeline for video Y, Cb, Cr information. Both pipelines provide signed YPbPr/RGB/YCbCr information that is provided to a graphic and video blender. An offset circuit provides suitable offset to generate unsigned YPbPr/RGB/YCbCr information to an integrated programmable synchronization signal generator prior to being sent through a DAC for output.

Figure 1:
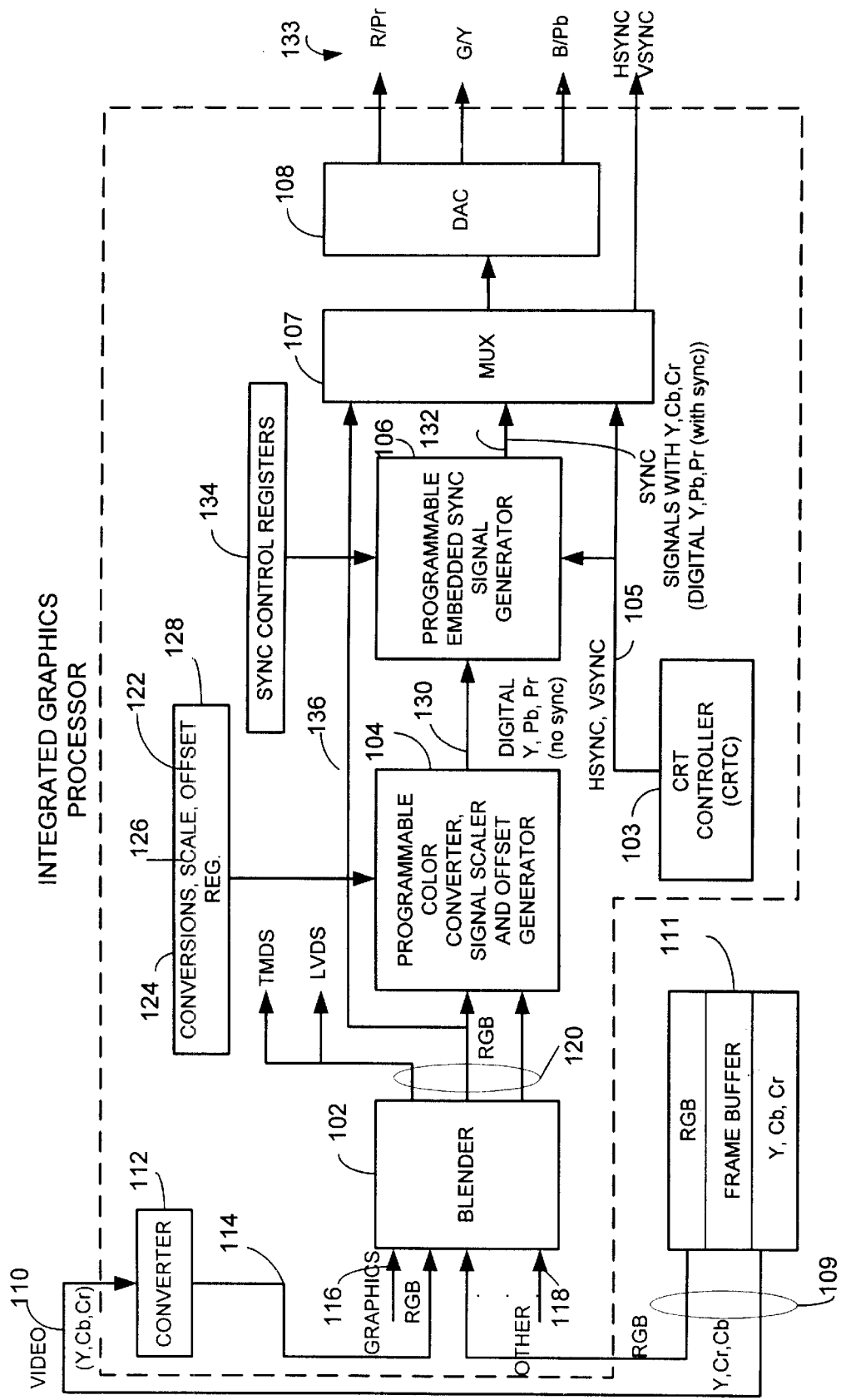
FIG. 1 is block diagram illustrating one example of an integrated graphics processor in accordance with one embodiment of the invention.

FIG. 1 illustrates an integrated graphics processor 100 having a graphics and video blender 102, a programmable color converter, signal scaler and offset generator 104, a programmable synchronization signal generator 106, a multiplexer 107 and a digital to analog converter (DAC) 108. The programmable color converter, signal amplitude scaler and offset generator 104 includes one or more general purpose programmable matrix multipliers wherein each of the three component outputs is a sum of products of each of the component inputs (e.g., R, G and B) and a constant offset term. The offset is used when the system utilizes data employing an embedded synchronization signal. As known in the art, the offset provides a suitable DC offset such that the black level will be more positive. For 8-bit YCbCr, 16 will be added to the Y and 128 added to the Cb and Cr. This puts the black level at Y=16, Cb=128 and Cr=128. Similarly, for an analog YPbPr or RGB output, an offset will be added to each component. The value of which would be sufficient to ensure the DAC would provide a positive voltage level for the negative embedded synchronization signal. Integrated graphics processor 100 may be an integrated circuit integrated as a single package.

The integrated graphics processor 100 may be operatively coupled through a bus 109 to an on-chip or external frame buffer 111. For example, the frame buffer 111 may be integrated as part of the integrated graphics processor 100 on a single chip. Alternatively, the integrated graphics processor 100 may be a separate chip and external to the frame buffer 111 if the frame buffer is in a separate integrated circuit package(s). The frame buffer 111 contains multiple formats of data for display on at least one display device. For example, the frame buffer 111 includes RGB information such as graphics information, and may also contain video information in a different format, such as YCbCr format. The integrated graphics processor 100 is operatively coupled to the frame buffer 111 and provides an embedded synchronization signal with data obtained from the frame buffer 111 for display on a plurality of display devices requiring different information formats. The processor device 100 also optionally provides separate synchronization signals 105, such as HSYNC and VSYNC signals and other related signals, if required by the attached display device, through CRT controller 103 and multiplexer 107.

An input video signal 110 received from any suitable video source, such as a DVD player, television input, the frame buffer 111 or any other suitable video source, is converted from one color space format to another by converter 112. In this example, the input video signal 110 may be in a YCbCr format and converter 112 converts it into an RGB output format 114. The blender 102 receives graphics information 116 from a suitable graphic source, such as from a host processor or any other source in, for example, a digital RGB format. Other information 118 may also be input to the blender 102.

The blender 102 is a conventional graphics and video blender having an input operative to receive the graphics 116 or video information 114. In this example, the video and graphics information 110 and 116 are obtained from the frame buffer 111 containing multiple formats of data for display on a display device. The graphics and video blender 102 has an output that outputs blended graphic and video information 120. For example, the blender 102, as known in the art, may be any suitable graphic and video blender that provides suitable graphic and video overlays, which mixes image layers together. The blended output information 120 is output in an RGB format, since the blender blends the information in a common format. The blended output information 120 may be communicated in a TMDS format or an LVDS format for display on a flat panel or other suitable display devices. The blended output information 120 may be output by multiplexer 107 to the DAC 108 or output in analog RGB format directly.

Alternatively, the blended output information 120 may be passed through the programmable color converter, signal scaler and offset generator 104 and the integrated programmable synchronization signal generator 106. The programmable color converter signal scaler and offset generator 104 is programmable through a set of register(s) 128 that contains suitable bits representing color space conversion definition data 124, signal scaling parameters 126 and offset parameters 122. However, a non-register based control may also be used. With a general purpose matrix result, the set of registers 128 may be combined or may be separate if desired. The offset generator generates a value of offset based on the blank level required for the embedded synchronization signal generator. The offset is set such that "black" data values in output information 120 map to the "blank" values in 132, to raise the black level of each color component. It will be recognized that any suitable offset generator may also be used. The programmable color converter signal scaler and offset generator 104 outputs an output signal 130 which has undergone color conversion, for example, from an RGB format to a digital YPbPr format, signal scaling, and offset, or any one of these operations. The output signal 130 serves as input to the programmable embedded synchronization signal generator 106. The output 130 does not include synchronization information but includes digital luma and chroma information.

When generating YPbPr or RGB signals for a television, video information already has the proper nominal signal range and color saturation. However, graphics information typically has a wider nominal range and more saturated color data that is best viewed on a television type display (it is meant for a computer CRT). One way to resolve this is applying color space conversion with different scaler factors to video information and graphics information.

The programmable color converter 104 provides color conversion, for example, based on sets of well known equations. For example, since graphics information typically has saturated color, lower ranges of RGB values are only necessary. However, video information typically has less saturated color and allows a higher range of RGB values. One algorithm may be used when the blended information 120 is graphics, and another algorithm may be used if the blended information is video. However, the same conversion algorithm may be used of all data if desired. One example of color conversion performed by the programmable color converter, signal scaler and offset generator may be as follows. However, it will be recognized that any suitable conversion method may also be used. For conversion, a single programmable matrix multiplier may be used. The blender 102 applies a flag bit indicating whether the information on bus 120 is originally graphics information or video information. For example, if multiplexed blending is used, a flag bit to indicate whether the data is graphics or video is generated based on whether the surface that each pixel came from is graphics or video. The flag bit is used by the programmable color converter 104 to select the appropriate coefficients as shown in the following equations for video information:

$Y=0.299R+0.587G+0.114B$ $Cb=-0.169r-0.331G+0.500B+128$ $Cr=0.500R-0.419G-0.081B+128$

For graphics data, coefficients are selected as shown in the following conversion equations:

$Y=0.257R+0.504G+0.098B+16$ $Cb=-0.148R-0.291G+0.439B+128$ $Cr=0.439R-0.368G-0.071B+128$

A programmable signal scaler operates to effectively scale input signals to the DAC to a level acceptable by the DAC so that the input signals to the DAC fit into the output range of the DAC. By way of example, if RGB data 120 ranging from 0–255 is output by blender 102, and the DAC 108 is a 10 bit DAC, the YPbPr can range from 0–1023 for each. Therefore, luma data is scaled and chroma data is scaled accordingly. Assuming the digital YPbPr 130 has a "blank" level at 300, values 0–299 are for sync signals only (below the blank level) and values 300–1023 can be used for visible display data. Therefore, chroma offsets (Coffset) and luma offsets (Loffset) are used where the embedded synchronization format requires signals below the "blank" level. If the embedded synchronization format does not require signals below the "blank", no offsets are necessary.

The programmable color converter, signal scaler and offset generator 104 may include a separate circuit or circuits for each of the operations. For example, the programmable color converter may include a color space converter circuit or algorithm which is operatively coupled to the graphic and video blender that includes a plurality of programmable matrix multipliers that perform color conversion from one color space to another color space. Accordingly, the color space converter is operatively coupled to the graphic and video blender 102 and provides conversion of graphic data or video data from a first format to a second format.

The programmable color converter, signal scaler and offset generator 104 may operate according to the following matrix equations and may perform the calculations in essentially one step:

For color conversion of video information pixels to 10 bit YCbCr:

$$\begin{bmatrix} Y' \\ Cb' \\ Cr' \end{bmatrix} = \begin{bmatrix} 0.299 & 0.587 & 0.114 \\ -0.169 & -0.331 & 0.500 \\ 0.500 & -0.419 & -0.081 \end{bmatrix} * \begin{bmatrix} R \\ G \\ B \end{bmatrix} + \begin{bmatrix} 0 \\ |512| \\ |512| \end{bmatrix}$$

For the case where a 10 bit DAC white level (input=1023) is 1.100V and the desired Y blank level is 286 mV and desired Y nominal white level is 1.000V then use the Y' to Y conversion equation:

VoltScale=1100 mV/1023 steps=1.075 mV/step

YScale=((NominalWhiteVolt−BlankVolt)/VoltScale)/(NominalWhiteLevel−BlankLevel)=((1000 mV−286 mV)/1.075 mV/step)/(940 step−64 step)=0.758

YOffset=BlankVolt/VoltScale−BlankLevel*YScale=286 mV/1.075 mV/step−64 step*0.758=217.5

$Y=YScale*Y'+YOffset=0.758*Y'+217.5$

And for the same DAC with a 1023 input level mapping to 1.100V output, the Cb'Cr' to PbPr mapping for the case where the PbPr zero point is to be at 500 mV with a +/−350 mV nominal range the conversion is as follows:

PScale=(PNominalRangeVolt/VoltScale)/(ChromaNominalTopLimit−ChromaNominalBottomLimit)=(2*350 mV/1.075 mV/step)/(960 step−64 step)=0.7266

POffset=(PzeroVolt/VoltScale)−ChromaZero*PScale=(500 mV/1.075 mV/step)−512*0.7266=93

$Pb=PScale*Cb'+POffset=0.7266*Cb'+93$ $Pr=PScale*Cr'+POffset=0.7266*Cr'+93$

When the above are multiplied together, the following mapping directly from RGB to YPbPr is obtained and may be performed in one step:

$$\begin{bmatrix} Y \\ Pb \\ Pr \end{bmatrix} = \begin{bmatrix} 0.194 & 0.381 & 0.074 \\ -0.107 & -0.211 & 0.318 \\ 0.318 & -0.266 & -0.052 \end{bmatrix} * \begin{bmatrix} R \\ G \\ B \end{bmatrix} + \begin{bmatrix} 266 \\ 465 \\ 465 \end{bmatrix}$$

One of ordinary skill in the art will recognize that the resulting equations can be readily determined if the DAC nominal white level is different than 1.100V, or if different Y nominal blank and white levels are desired, or if different PbPr scaling and offsetting is desired for a specific YPbPr standard. In particular, any DC offset value could be used in any of the Y, Pb or Pr outputs by adjusting these equations without affecting the results as long as the output signals still have the required scales and sync ranges needed for the television input.

The integrated programmable embedded synchronization signal generator 106 is operatively coupled to the digital YPbPr 130 to receive synchronization signals 105 (e.g., horizontal and vertical synchronization signals), to provide a plurality of different formats of display synchronization signals 132 for blended information based on a type of display device receiving output signals from the DAC 108. The programmable embedded synchronization signal generator 106 is programmable to output at least synchronization signals for component video signals used in high definition television display devices and in high quality standard definition television display devices. For example, the programmable synchronization generator 106 is programmable through synchronization control register 134 to output at least an embedded synchronization signal, and a multilevel synchronization signal, such as a trilevel synchronization signal, or a negative sync pulse. A separate synchronization signal, such as sync signal 105, that is not embedded with video information (e.g., luma and chroma information) is provided by the CRT controller 103 and output through multiplexer 107. In addition, the programmable embedded synchronization signal generator 106 is programmable to provide variable synchronization signal slew rates and amplitudes. Sync signal 105 is generated when the blended output information 120 bypasses the programmable color converter 104 and is passed to the multiplexer 107. The multiplexer 107 may be any suitable multiplexer which is selectively controlled to select whether to output digital YPbPr signal information 132 or the RGB information 136 based on the type of display device.

The digital to analog converter 108 is operatively coupled to the programmable embedded synchronization signal generator 106 and outputs analog signals including processed video or graphics data and at least an embedded synchronization signal as output 132 for output to a display device.

Where the programmable embedded synchronization signal generator 106 generates a trilevel embedded synchronization signal for HDTV's, the trilevel embedded synchronization signal may be of the type defined in CEA 770.3. The programmable embedded synchronization signal generator 106 can also be programmed to generate negative sync signals such as those defined in CEA 770.1 and 770.2.

Accordingly, the integrated graphics processor 100 contains in one embodiment on a single chip, a blender 102, a programmable color converter, signal scaler and offset generator 104 and a programmable embedded synchronization signal generator 106 to provide programmability for a graphics control chip to drive and provide suitable output compatible with different output standards.

Figure 2:
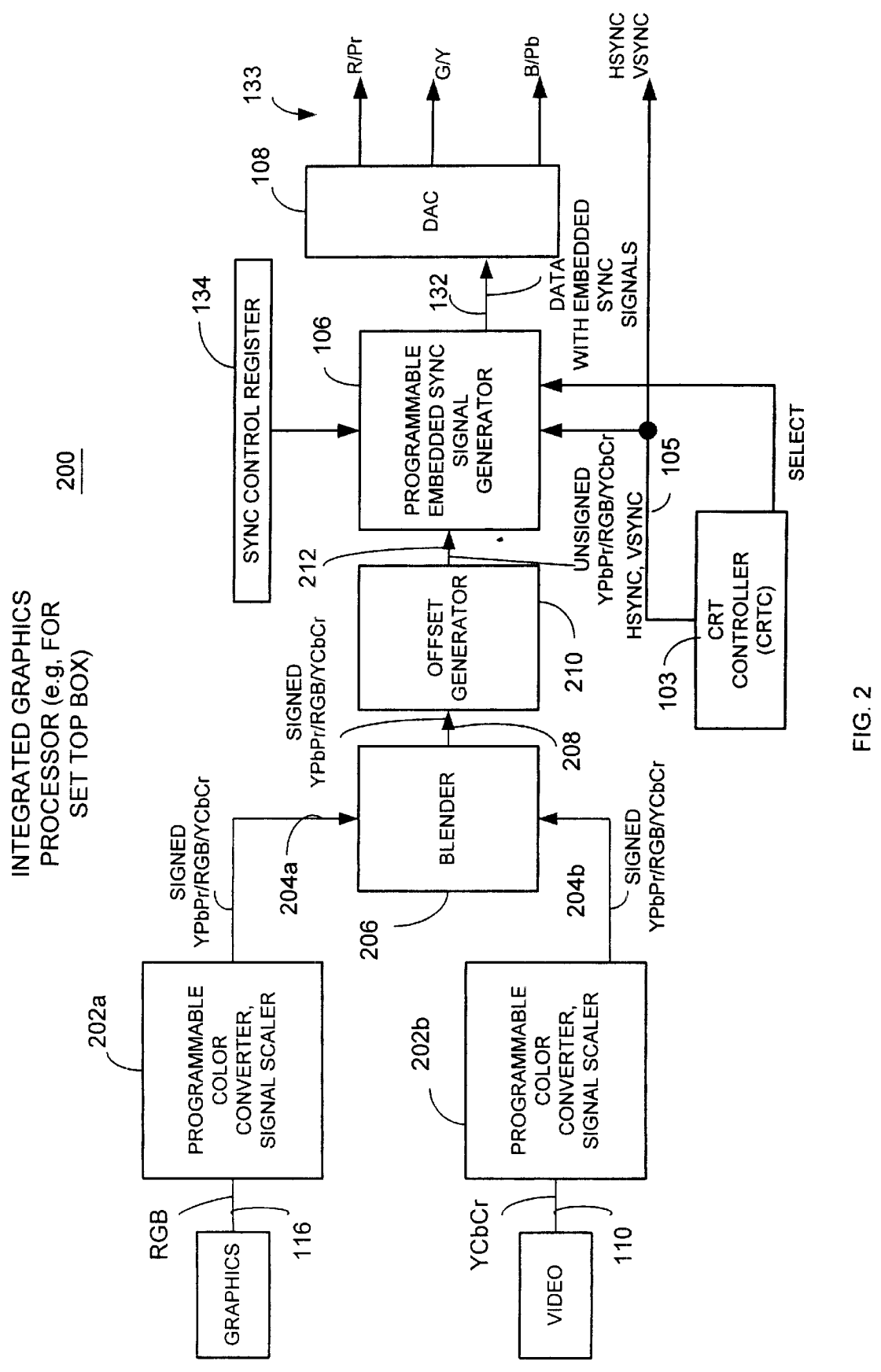

FIG. 2 illustrates another embodiment of an integrated graphics processor 200 for an HDTV set top box or other suitable application. In this embodiment, graphics information 116 and video information 110 are passed through separate pipelines which include a programmable color converter and signal scaler 202a and 202b. Each of the programmable color converter and signal scalers 202a and 202b may be of the same type described with respect to the programmable color converter, signal scaler and offset generator 104 of FIG. 1. However, the offset generator has been removed to a new point in FIG. 2. The programmable color converter and signal scaler 202a and 202b output signed YPbPr, signed RGB, or signed YCbCr data indicated at 204a and 204b. Blender 206 suitably mixes layers and blends the graphics and video information 204a and 204b and outputs a signed blended output 208 to an offset generator 210. The offset generator 210 offsets the signed output YPbPr or signed RGB or signed YCbCr information similar to the offset generator of the programmable color converter signal scaler and offset generator 104 as described above. The offset generator 210 by offsetting each of the luma and chroma components, outputs blended unsigned information 212 to the programmable embedded synchronization signal generator 106. In this embodiment, the programmable embedded synchronization signal generator 106 outputs the embedded synchronization signal information 132 as described above. In this embodiment, the blending is performed after color conversion signal scaling. It will also be recognized that other variations may also be desirable.

In this embodiment, the color conversion is done on signed data. However, where YUV and YCbCr are unsigned, each are converted to a signed value by subtracting its offset. This is the purpose of the Constant (Const) below. A scaling algorithm is used to scale down the data such that the resultant data will be in the range of the DAC, such as the type of scaling algorithm described above. The function of the color converter is to implement a 4×3 matrix that is performed by matrix multiplication using a programmable matrix multiplier that is suitable programmed with the matrix values as required. As with the above embodiment, the programmable matrix multipliers are programmable to apply a different transformation to convert pixels from a first color format to a second color format. A color conversion matrix as shown below may be used.

$$\begin{bmatrix} YG \\ PbB \\ PrR \end{bmatrix} = \begin{bmatrix} C00 & C01 & C02 \\ C10 & C11 & C12 \\ C20 & C21 & C22 \end{bmatrix} \begin{bmatrix} YG \\ CbB \\ CrR \end{bmatrix} + \begin{bmatrix} Const0 \\ Const1 \\ Const2 \end{bmatrix}$$

Where YG=Luma or green data, CbB/PbB=Cb or Pb or Blue data, CrR/PrR=Cr or Pr or Red data, C<num>=signed floating point coefficient, Const<num>=signed floating point coefficient.

For example, suppose we wanted to convert from RGB to YCbCr 601 using the equations below.

$$\begin{bmatrix} G \\ B \\ R \end{bmatrix} = \begin{bmatrix} 1.000 & -0.3441 & -0.7141 \\ 1.000 & 1.7720 & 0.0000 \\ 1.000 & 0.0000 & 1.4020 \end{bmatrix} \begin{bmatrix} Y \\ Cb \\ Cr \end{bmatrix}$$

In order to do any type of manipulation to the data, we must convert the unsigned values to a signed value (i.e., remove the DC offset). For an 8-bit YCbCr 601, there is a DC offset of 16 on the Y and 128 on the Cb and Cr for 8-bit video. Therefore, the matrix becomes $$\begin{bmatrix} G \\ B \\ R \end{bmatrix} = \begin{bmatrix} 1.000 & -0.3441 & -0.7141 \\ 1.000 & 1.7720 & 0.0000 \\ 1.000 & 0.0000 & 1.4020 \end{bmatrix} \begin{bmatrix} Y-16 \\ Cb-128 \\ Cr-128 \end{bmatrix}$$

or $$\begin{bmatrix} G \\ B \\ R \end{bmatrix} = \begin{bmatrix} 1.000 & -0.3441 & -0.7141 \\ 1.000 & 1.7720 & 0.0000 \\ 1.000 & 0.0000 & 1.4020 \end{bmatrix} \begin{bmatrix} Y \\ Cb \\ Cr \end{bmatrix} +$$

$$\begin{bmatrix} 1.000 & -0.3441 & -0.7141 \\ 1.000 & 1.7720 & 0.0000 \\ 1.000 & 0.0000 & 1.4020 \end{bmatrix} \begin{bmatrix} -16 \\ -128 \\ -128 \end{bmatrix}$$

which becomes $$\begin{bmatrix} G \\ B \\ R \end{bmatrix} = \begin{bmatrix} 1.000 & -0.3441 & -0.7141 \\ 1.000 & 1.7720 & 0.0000 \\ 1.000 & 0.0000 & 1.4020 \end{bmatrix} \begin{bmatrix} Y \\ Cb \\ Cr \end{bmatrix} + \begin{bmatrix} 119 \\ 243 \\ 195 \end{bmatrix}$$

Again using the scale from the previous example, Yscale= 0.758 the data is scaled to the DAC level. So the final equation becomes.

$$\begin{bmatrix} G \\ B \\ R \end{bmatrix} = \begin{bmatrix} 0.758 & -0.2608 & -0.5413 \\ 0.758 & 1.3432 & 0.0000 \\ 0.758 & 0.0000 & 1.0627 \end{bmatrix} \begin{bmatrix} Y \\ Cb \\ Cr \end{bmatrix} + \begin{bmatrix} 90 \\ 184 \\ 147 \end{bmatrix}$$

Once the matrix calculation is performed, by both color converters to a common format, they are blended using the blender 208. The offset generator 210 adds a constant value (Ie. Yoffset) to the blender results obtained above and the result 212 is clamped so the values do not exceed a predetermined limit.

Figure 3:
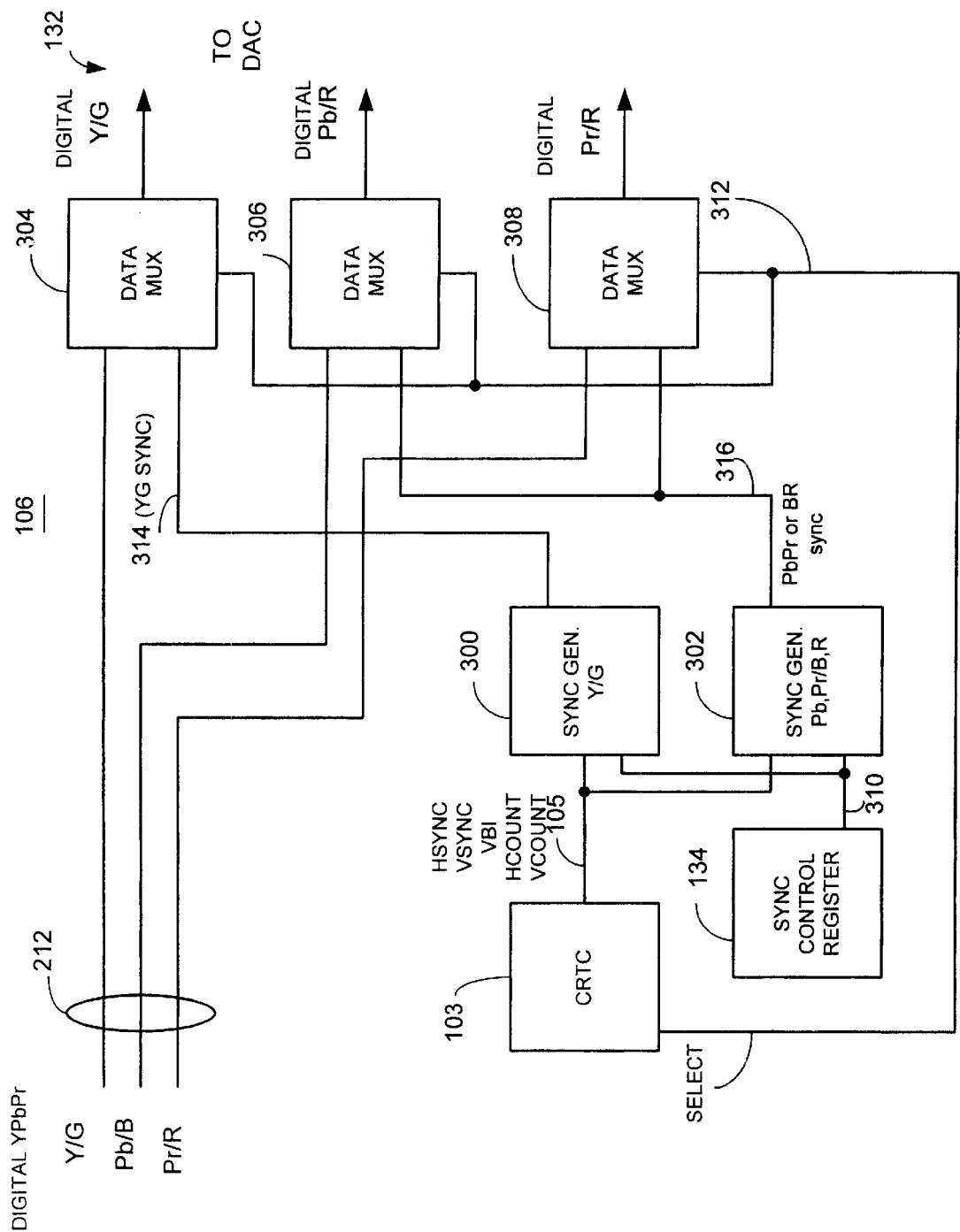
FIG. 3 is a block diagram illustrating one example of a programmable embedded synchronization signal generator in accordance with one embodiment of the invention.
Figure 4:
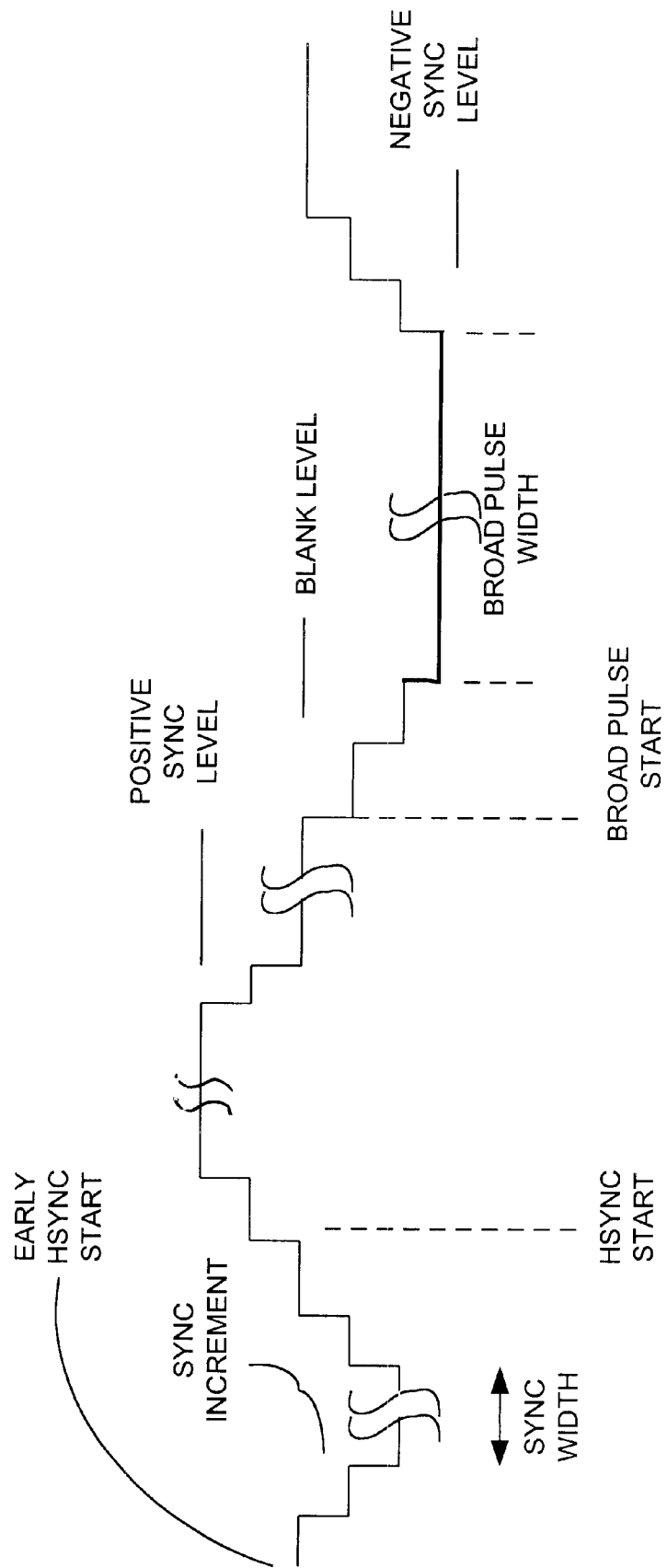
FIG. 4 is a diagram illustrating a tri-level synchronization pulse.

FIG. 3 illustrates one example of the programmable embedded synchronization signal generator 106. FIG. 4 graphically illustrates a tri-level synchronization pulse and a broad pulse that can be generated by the programmable embedded synchronization signal generator. The broad pulse is only on lines containing VSYNC as known in the art. The programmable embedded synchronization signal generator 106 includes a synchronization signal generator for Y or G 300, a synchronization signal generator 302 for Pb, Pr, B or R, a first multiplexer 304, a second multiplexer 306, and a third multiplexer 308. The operation of the embedded synchronization signal generators 300 and 302 will be described also with reference to FIG. 4. Where the synchronization control register data 310 indicates that the synchronization generator 300 is to generate an embedded synchronization signal, a positive YG tri-level synchronization signal may be embedded by determining if each synchronization start portion of the input signal is equal to HCOUNT, where HCOUNT is a horizontal counter that spans the width of the display. If so, the process includes starting at the YG blank level and adding a YG synchronization increment until a YG positive synchronization level is reached. The synchronization generator 300 will count horizontal clocks (e.g. HCOUNT values) until this synchronization width is reached. Once reached, the synchronization generator 300 will subtract a YG synchronization increment until the YG blank level is reached.

For the synchronization generator 300 to generate a negative YG tri-level embedded synchronization signal, the synchronization generator 300 determines if an early horizontal sync start signal portion is equal to an HCOUNT value as provided by the CRTC. If so, the synchronization generator 300 starts at a YG blank level and subtracts YG synchronization increments until a YG negative sync level is reached. The synchronization generator 300 then counts horizontal clocks until the synchronization width is reached. Once reached, the synchronization generator 300 adds the YG synchronization element until the YG blank level is reached. The CRTC controls the select signal 312 to output the appropriate embedded synchronization information and data as required, to the DAC.

To provide an embedded YG broad pulse, the synchronization generator 300 determines if the broad pulse start signal portion is equal to HCOUNT and is in a vertical synchronization region. If so, the synchronization generator 300 starts at the YG blank level and subtracts the YG synchronization increment until the YG negative synchronization level is reached. The synchronization generator 300 then counts the horizontal clocks until a broad pulse width is reached. Once reached, the synchronization generator 300 adds YG synchronization increments until the blank level is reached. As used herein, the YG synchronization signal can be equal to a positive YG tri-level synchronization signal, a negative YG tri-level synchronization signal, or a YG broad pulse synchronization signal. synchronization signal, a negative YG tri-level synchronization signal, or a YG broad pulse synchronization signal.

The synchronization generator 302 likewise generates positive and negative tri-level synchronization signals and broad pulse synchronization signals. To generate a positive PbPr and BR tri-level synchronization signal, the synchronization generator 302 determines if the HSYNC start equals the HCOUNT. If so, the synchronization generator 302 starts at the Pb, Pr or BR (blue or red) blank level and adds a Pb, Pr or BR synchronization increment until a Pb,Pr positive synchronization level is reached. The synchronization generator 302 then counts horizontal clocks until a synchronization width is reached. Once reached, the synchronization generator 302 subtracts the PbPr synchronization increment until the PbPr blank level is reached.

The synchronization generator 302 generates a negative Pb, Pr tri-level embedded synchronization signal by determining if an early HSYNC start equals the HCOUNT value. The synchronization generator 302 starts at the Pb, Pr blank level and subtracts the Pb, Pr synchronization increment until the Pb, Pr negative synchronization level is reached. The synchronization generator then counts the horizontal clocks until a synchronization width is reached. Once reached, the synchronization generator 302 adds the Pb, Pr synchronization increment until the Pb, Pr level is reached.

To generate a Pb, Pr broad pulse, the synchronization generator 302 determines if the broad pulse start has begun by comparing it to an HCOUNT value and if the broad pulse start occurs in a VSYNC region. If so, the synchronization generator 302 starts at the Pb, Pr blank level and subtracts the Pb, Pr synchronization increment until the Pb, Pr negative synchronization level is reached. The synchronization generator 302 then counts the horizontal clocks until a broad pulse width is reached. Once reached, the synchronization generator adds the Pb, Pr synchronization increment until a Pb, Pr blank level is reached. The synchronization generators 300 and 302 may be implemented using any suitable logic, or may be implemented in software, if desired.

The data multiplexer 304 is controlled by the CRTC through select line 312 such that if received data is not in a vertical blank or horizontal blank region, the multiplexer 304 is controlled to output Y or G data. Otherwise, it is controlled to output the Y or G synchronization pulse 314.

The Pb, Pr multiplexers 306 and 308 are controlled by the CRTC through select line 312 such that if the received signal is not in a vertical blank or horizontal blank region, the multiplexers are controlled to output Pb, Pr data. Otherwise, the multiplexers 308 and 306 are controlled to output the Pb, Pr or BR synchronization signal 316 as embedded synchronization information. The sync control register 134 and CRTC are used to control the sync generators and multiplexers to optionally turn on or off the negative and/or positive sync portion of the tri-level sync signal and broad pulse to provide outputs such as those defined by CEA 770.1, 770.2, 770.3 or any suitable standard or requirement.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An integrated graphics processor comprising:
    a graphic and video blender having an input operative to receive graphics or video data obtained from a frame buffer containing multiple formats of data for display on at least one display device, and an having an output; and
    a programmable embedded synchronization signal generator operatively coupled to the output to provide a plurality of different formats of display synchronization signals for blended information based on a type of the at least one display device.

2. The integrated graphics processor of claim 1 including a digital to analog converter (DAC) operatively coupled to the programmable embedded synchronization signal generator that outputs analog signals including processed video or graphics data and at least one of a programmed display synchronization signal.

3. The integrated graphics processor of claim 1 wherein the programmable embedded synchronization signal generator is programmable to output at least component video synchronization signals for a high definition television display device and for a high quality standard definition television display device.

4. The integrated graphics processor of claim 1 wherein the programmable embedded synchronization signal generator is programmable to output at least one of the following formats: an embedded synchronization signal, a multi-level synchronization signal and a separate synchronization signal.

5. The integrated graphics processor of claim 1 wherein the programmable embedded synchronization signal generator is programmable to provide variable synchronization signal slew rates and amplitudes.

6. The integrated graphics processor of claim 1 wherein the frame buffer is on-chip with the graphics processor.

7. The integrated graphics processor of claim 1 wherein the frame buffer is external to the integrated graphics processor.

8. The integrated graphics processor of claim 1 including a programmable offset circuit operatively coupled to the programmable embedded synchronization signal generator to generate a value of offset based on the blank level required for the programmable embedded synchronization signal generator.

9. The integrated graphics processor of claim 1 including a color space converter operatively coupled to the graphic and video blender.

10. The integrated graphics processor of claim 9 wherein the color space converter includes a plurality of programmable matrix multipliers wherein each matrix multiplier is programmable to apply a different transformation to convert pixels from a first color format to a second color format.

11. The integrated graphics processor of claim 2 wherein the DAC outputs RGB information with embedded synchronization information.

12. An integrated graphics processor comprising:
   a graphic and video blender having an input operative to receive graphics or video data obtained from a frame buffer containing multiple formats of data for display on at least one display device, and an having an output;
   a programmable embedded synchronization signal generator operatively coupled to the output to provide a plurality of different formats of display synchronization signals for blended information based on a type of the at least one display device;
   a color space converter operatively coupled to the graphic and video blender to provide conversion of graphics data or video data from a first format to a second format; and
   a digital to analog converter (DAC) operatively coupled to the programmable embedded synchronization signal generator that outputs analog signals including processed video or graphics data and at least one of a programmed display synchronization signal.

13. The integrated graphics processor of claim 12 wherein the programmable embedded synchronization signal generator is programmable to output at least component video synchronization signals for a high definition television display device and for a high quality standard definition television display device.

14. The integrated graphics processor of claim 13 wherein the programmable embedded synchronization signal generator is programmable to output at least one of the following formats: an embedded synchronization signal, a multi-level synchronization signal and a separate synchronization signal.

15. The integrated graphics processor of claim 14 wherein the programmable embedded synchronization signal generator is programmable to provide variable synchronization signal slew rates and amplitudes.

16. The integrated graphics processor of claim 12 wherein frame buffer is on-chip with the graphics processor.

17. The integrated graphics processor of claim 12 wherein frame buffer is external to the integrated graphics processor.

18. The integrated graphics processor of claim 12 including a programmable offset circuit operatively coupled to the programmable embedded synchronization signal generator to generate a value of offset based on the blank level required for the programmable embedded synchronization signal generator.

19. The integrated graphics processor of claim 12 wherein the color space converter includes a plurality of programmable matrix multipliers wherein each matrix multiplier is programmable to apply a different transformation to convert pixels from a first color format to a second color format.

20. The integrated graphics processor of claim 13 wherein the DAC outputs RGB information with embedded synchronization information.

21. A graphics processing system comprising:
   a frame buffer operative to contain multiple formats of data for display on at least one display device; and
   an integrated graphics processor operatively coupled to the frame buffer having a programmable embedded synchronization signal generator operatively coupled to provide an embedded synchronization signal for use by a display device.

22. The graphics processing system of claim 21 wherein the integrated graphics processor includes:
   a graphic and video blender having an input operative to receive graphics or video obtained data from the frame and an having an output; and
   a programmable embedded synchronization signal generator operatively coupled to the output to provide a plurality of different formats of display synchronization signals for blended information based on a type of the display device.

23. The graphics processing system of claim 21 including a digital to analog converter (DAC) operatively coupled to the programmable embedded synchronization signal generator that outputs analog signals including processed video or graphics data and at least one of a programmed display synchronization signal.

24. The graphics processing system of claim 22 wherein the programmable embedded synchronization signal generator is programmable to output at least component video synchronization signals for a high definition television display device and for a high quality standard television display device.

25. The graphics processing system of claim 22 wherein the programmable embedded synchronization signal generator is programmable to output at least one of the following formats: an embedded synchronization signal, a multi-level synchronization signal and a separate synchronization signal.

26. The graphics processing system of claim 22 wherein the programmable embedded synchronization signal generator is programmable to provide variable synchronization signal slew rates and amplitudes.

27. The graphics processing system of claim 21 wherein the frame buffer is on-chip integrated in with the integrated graphics processor.

28. The graphics processing system of claim 21 wherein the frame buffer is external to the integrated graphics processor.

29. The graphics processing system of claim 21 wherein the integrated graphics processor includes a programmable offset circuit operatively coupled to the programmable embedded synchronization signal generator to provide an offset corresponding to a sign of a YPbPr value.

30. The graphics processing system of claim 21 wherein the integrated graphics processor includes a color space converter operatively coupled to the graphic and video blender.

31. The graphics processing system of claim 30 wherein the color space converter includes a plurality of programmable matrix multipliers wherein each matrix multiplier is programmable to apply a different transformation to convert pixels from a first color format to a second color format.

* * * * *